(12) United States Patent
Arai

(10) Patent No.: US 8,199,869 B2
(45) Date of Patent: Jun. 12, 2012

(54) COMMUNICATION APPARATUS

(75) Inventor: Norio Arai, Kanagawa (JP)

(73) Assignee: Renesas Electronics Corporation, Kawasaki, Kanagawa (JP)

( * ) Notice: Subject to any disclaimer, the term of this patent is extended or adjusted under 35 U.S.C. 154(b) by 516 days.

(21) Appl. No.: 12/385,450

(22) Filed: Apr. 8, 2009

(65) Prior Publication Data

US 2009/0262875 A1 Oct. 22, 2009

(30) Foreign Application Priority Data

Apr. 22, 2008 (JP) ................................ 2008-111566

(51) Int. Cl.
*H03D 3/24* (2006.01)

(52) U.S. Cl. ........ 375/373; 375/371; 375/354; 375/332; 375/355

(58) Field of Classification Search .................. 375/373, 375/116, 119, 360, 371, 330, 332, 354, 355; 327/91

See application file for complete search history.

(56) References Cited

U.S. PATENT DOCUMENTS

| | | | | |
|---|---|---|---|---|
| 4,414,676 A | * | 11/1983 | Kraul et al. | 375/368 |
| 4,748,623 A | * | 5/1988 | Fujimoto | 370/513 |
| 5,535,252 A | * | 7/1996 | Kobayashi | 375/371 |
| 6,278,755 B1 | * | 8/2001 | Baba et al. | 375/360 |
| 2003/0098723 A1 | * | 5/2003 | Natsume | 327/91 |

FOREIGN PATENT DOCUMENTS

JP 8-8811 1/1996

* cited by examiner

*Primary Examiner* — Kabir A Timory
*Assistant Examiner* — Helene Tayong
(74) *Attorney, Agent, or Firm* — McGinn IP Law Group, PLLC

(57) ABSTRACT

A communication apparatus including a first unit which performs sampling of a synchronization pattern included in a signal with multiple clocks having different phases and identifies clocks where a predetermined synchronization pattern could be correctly sampled, from among the multiple clocks; a second unit which identifies, from among the multiple clocks, a first and second clock having a first clock edge which is nearest to the time point at which the data of the synchronization pattern changes and a second clock edge which is second nearest to the time point next to the first clock edge, respectively, the first and second clock edges being where the sampling of the synchronization pattern is performed; and a judgment section which judges one of clocks other than the first and second clocks, among the clocks with which the predetermined synchronization pattern was correctly sampled, to be used for sampling of the signal.

5 Claims, 6 Drawing Sheets

COMMUNICATION APPARATUS

BACKGROUND OF THE INVENTION

1. Field of the Invention

A communication apparatus according to the present invention relates particularly to a communication apparatus that judges which clock of which phase, among multiphase clocks, should be selected.

2. Description of the Related Art

When data is transmitted and received between different semiconductor apparatuses, delay or jitter of a signal occurs on the transmission line. In this case, if the semiconductor apparatuses which perform transmission and receiving of the data operate on the basis of clock signals which are in an asynchronous relationship with each other, there is a problem that the data is not correctly received by the receiving-side apparatus. Accordingly, the receiving-side apparatus controls the phase of a clock used in receiving the data to correctly perform data receiving. An example of a method for the receiving-side apparatus to control the phase of the clock used in data receiving as described above is disclosed in Japanese Patent Laid-Open No. 8-8811.

FIG. 6 shows a block diagram of a synchronization pull-in apparatus 100 described in Japanese Patent Laid-Open No. 8-8811. The synchronization pull-in apparatus 100 shown in FIG. 6 has a unique word (UW) detector 102, a TDMA timing generator 107, a phase detector 106, a microprocessor 120, a correction counter 124, a 1/n frequency divider 103, a corrector 104 and a 1/m frequency divider 105.

The unique word detector 102 detects a unique word from serial digital received data which is obtained by demodulating a radio wave from a base station by a demodulator 101 and a receiving clock, and outputs the detection timing. The TDMA timing generator 107 generates a TDMA timing at a symbol clock and generates a transmission slot timing and receiving slot timing of the synchronization pull-in apparatus 100. The phase detector 106 compares the phases of the symbol timing at the time of receiving and the symbol clock of the synchronization pull-in apparatus 100 according to the unique word detection timing, and outputs the value of the phase difference. The microprocessor 120 calculates the correction amount of the basic clock on the basis of the phase difference value outputted by the phase detector 106 and instructs correction of advance/delay. The correction counter 124 generates a correction timing on the basis of the correction amount specified by the microprocessor 120. The 1/n frequency divider 103 reduces a clock corresponding to (n×m) times the symbol timing frequency at the time of receiving to 1/n to generate the basic clock. By performing clock deletion for the basic clock in the case where the correction timing outputted by the correction counter 124 is for advance correction and performing clock insertion for the basis clock in the case of delay correction, the corrector 104 outputs a synchronization-corrected clock obtained by performing the correction operation. The 1/m frequency divider 105 reduces the synchronization-corrected clock to 1/m to output a symbol clock indicating the symbol timing of the synchronization pull-in apparatus 100.

In the synchronization pull-in apparatus 100, the microprocessor 120 calculates the correction amount of the basic clock on the basis of the value of the phase difference between the symbol timing at the time of receiving, which has been detected by the phase detector 106, and the phase of the symbol clock of the synchronization pull-in apparatus 100. Then, by operating on the basis of the basic clock corrected with the calculated correction amount, the synchronization pull-in apparatus 100 secures operation compatibility with the base station.

However, in the synchronization pull-in apparatus 100, since the correction amount is calculated by the microprocessor 120, it takes much time to perform the arithmetic operation. Therefore, there is a problem that the basic clock correction timing is later than the receiving timing. There is a problem that, when such delay occurs, it is not possible to correctly process the data of the beginning part of received data. Recently, the data transmission speed has been improved, and the influence of the correction timing delay upon data processing is becoming a more noticeable problem.

SUMMARY

An aspect of a communication apparatus according to the present invention comprises: a first unit which compares a result of sampling a synchronization pattern included in a signal with multiple clocks having different phases and a predetermined synchronization pattern, and identifies clocks with which a predetermined synchronization pattern has been correctly sampled, from among the multiple clocks; a second unit which identifies, from among the multiple clocks, a first clock and a second clock having a first clock edge which is the nearest to the time point at which the data of the synchronization pattern changes and a second clock edge which is the second nearest to the time point next to the first clock edge, respectively, the first and second clock edges being clock edges where the sampling of the synchronization pattern included in the signal is performed; and a phase judgment section which judges one of clocks other than the first and second clocks, among the clocks with which the predetermined synchronization pattern has been correctly sampled, to be a clock to be used for sampling of the signal.

According to the communication apparatus according to the present invention, the first unit performs sampling of a synchronization pattern included in a signal with multiple clocks having different phases, and identifies clocks with which a predetermined synchronization pattern can be correctly sampled, from among the multiple clocks. Next, the second unit identifies two clock edges close to a time point at which the data of the synchronization pattern changes, among clock edges where sampling of the synchronization pattern is performed. Then, the second unit identifies two different clocks having the identified two clock edges. Then, the judgment section judges one of clocks other than the two clocks identified by the second unit, among the clocks identified by the first unit, to be a clock to be used for sampling of the synchronization pattern. By being provided with the first unit, the second unit and the judgment section, the communication apparatus according to the present invention can select a clock with which a signal can be certainly sampled, without causing a microprocessor and the like to perform a complicated operation.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

First Embodiment

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Figure 1:
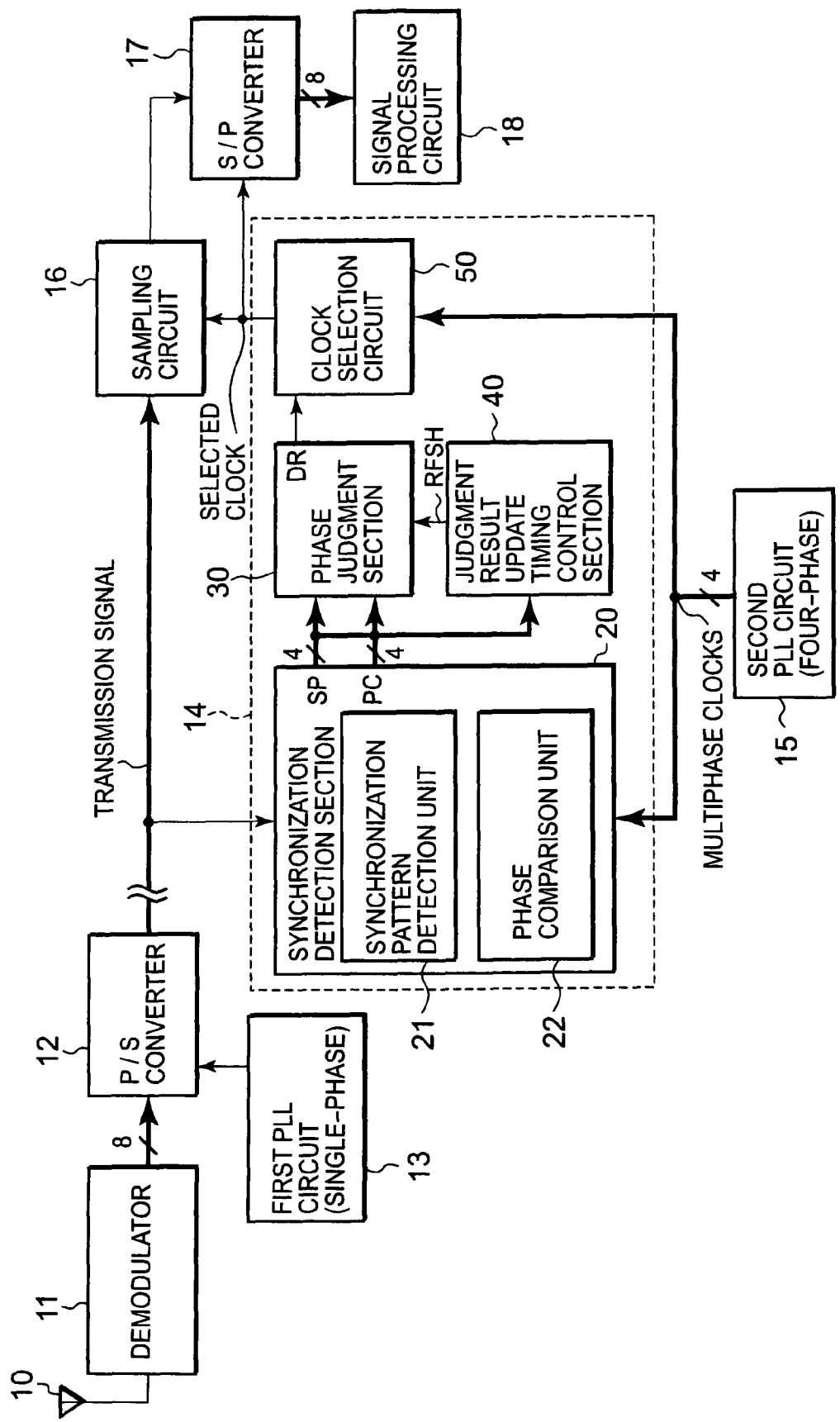
FIG. 1 is a block diagram of a receiving apparatus according to a first embodiment.

An embodiment of the present invention will be described below with reference to drawings. FIG. 1 shows a block diagram of a communication apparatus (concretely, a receiving apparatus) provided with a clock phase selection circuit 14 according to the embodiment of the present invention. As shown in FIG. 1, the receiving apparatus has an antenna 10, a demodulator 11, a parallel/serial converter 12, a first PLL (Phase Locked Loop) circuit 13, the clock phase selection circuit 14, a second PLL circuit 15, a sampling circuit 16, a serial/parallel converter 17 and a signal processing circuit 18.

The demodulator 11 demodulates a wireless signal received via the antenna 10 to generate a data signal. This data signal is, for example, parallel data with a bit width of 8 bits. The parallel/serial converter 12 converts the parallel data to serial data and outputs it as a transmission signal. The transmission signal constitutes, for example, a data string with a bit width of 1 bit. The transmission signal in this embodiment has a synchronization pattern area and a payload data area in the data string. In the synchronization pattern area, synchronization pattern data set by the system in advance is stored. In the payload data area, processing data to be processed in the system is stored. The system transmits the processing data after the synchronization pattern data. The transmission unit of the processing data is managed by the synchronization pattern data. The first PLL circuit 13 outputs, for example, a single-phase first clock after the synchronization pattern data. This first clock is used for conversion of the data string by the parallel/serial converter 12.

The clock phase selection circuit 14 selects a one-phase clock from among the phase of the transmission signal and multiphase clocks generated by the second PLL circuit 15, and outputs it as a selected clock. The clock phase selection circuit 14 has a synchronization detection section 20, a third unit (for example, a phase judgment section) 30, a judgment result update timing control section 40 and a clock selection circuit 50. The synchronization detection section 20 outputs a synchronization pattern detection result signal SP and a phase comparison result signal PC on the basis of the synchronization pattern data and the multiphase clocks. In this embodiment, the synchronization detection section 20 has a first unit (for example, a synchronization pattern detection unit) 21 and a second unit (for example, a phase comparison unit) 22. The phase judgment section 30 judges a synchronization clock having a phase different from the data change point of the synchronization pattern data on the basis of the synchronization pattern detection result signal SP and the phase comparison result signal PC, and outputs a phase judgment signal which indicates a selected clock. Receiving the synchronization pattern detection result signal SP, the judgment result update timing control section 40 outputs an update signal which updates the position of the phase of the synchronization clock held by the phase judgment section 30. The clock selection circuit 50 selects a clock having the same phase as the synchronization clock from among the multiphase clocks, on the basis of the phase judgment signal, and outputs it as a selected clock. The detailed configuration of the clock phase selection circuit 14 will be described later.

The second PLL circuit 15 generates multiphase clocks. The multiphase clocks in this embodiment are configured by four clocks having different phases. Therefore, output from the second PLL circuit 15 is configured with a bit width of 4 bits, and each bit corresponds to a one-phase clock. In this embodiment, the first PLL circuit 13 and the second PLL circuit 15 have the same frequency, and they generate clocks which are in an asynchronous relationship with each other.

The sampling circuit 16 performs sampling of data included in the transmission signal on the basis of the selected clock, and outputs the sampled data to the serial/parallel converter 17. The serial/parallel converter 17 synchronizes the serial data sampled by the sampling circuit 16 with the selected clock, converts it to parallel data and outputs the parallel data. In this embodiment, the parallel data generated by the serial/parallel converter 17 has the same bit width (for example, 8 bits) as the data signal inputted into the parallel/serial converter 12. The signal processing circuit 18 performs signal processing (for example, decoding processing including path search of received data) on the basis of the parallel data outputted from the serial/parallel converter 17, and generates a control signal or a data signal to be used in a subsequent-stage circuit (not shown).

Figure 2:
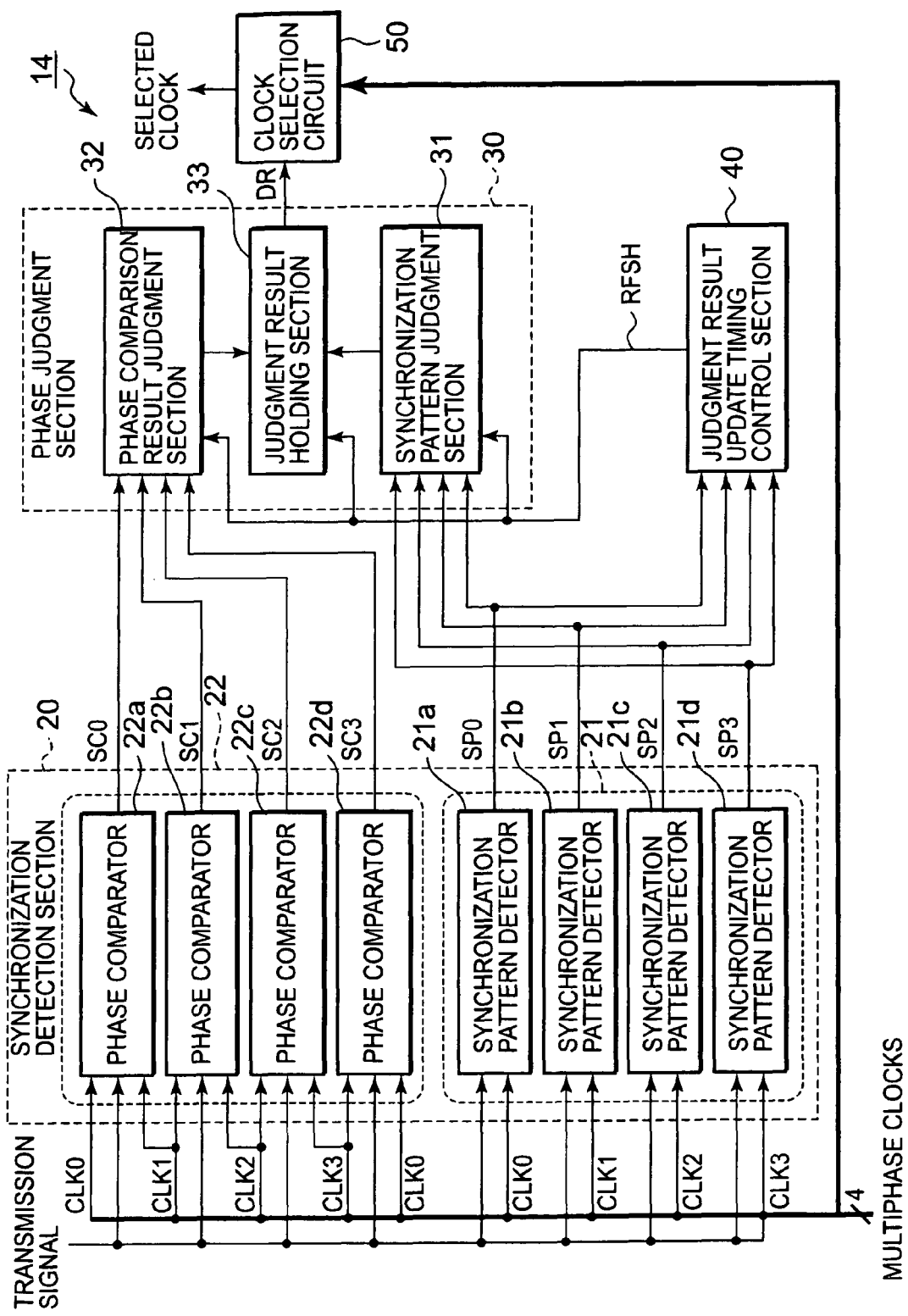
FIG. 2 is a block diagram of a clock phase selection circuit according to the first embodiment.

Next, the details of the clock phase selection circuit 14 according to this embodiment will be described. FIG. 2 shows a block diagram of the clock phase selection circuit 14. As shown in FIG. 2, a synchronization pattern detection unit 21 in the synchronization detection section 20 has four synchronization pattern detectors (21a to 21d in the figure) according to the number of phases of the multiphase clocks. Receiving the transmission signal and the multiphase clocks, the synchronization pattern detectors 21a to 21d output synchronization pattern detection result signals SP0 to SP3 indicating which clock of which phase, among the multiphase clocks, the synchronization pattern data included in the synchronization pattern area has been detected with. Specifically, each of the synchronization pattern detectors 21a to 21d is a sampling circuit for performing sampling of a received transmission signal at the timing of a received clock edge (for example, the rising edge of a received clock).

The synchronization pattern detectors 21a to 21d are the same as one another, and they are different in the phase of a clock used for detecting synchronization pattern data. For example, the synchronization pattern detector 21a uses the first clock CLK0 among the multiphase clocks to detect the synchronization pattern data. That is, the synchronization pattern detector 21a performs sampling of a synchronization pattern included in a received transmission signal in response to the timing of a clock edge of the first clock CLK0. The synchronization pattern detector 21b uses the second clock CLK1 among the multiphase clocks to detect the synchronization pattern data. That is, the synchronization pattern detector 21b performs sampling of the synchronization pattern included in the received transmission signal in response to the timing of a clock edge of CLK1. The synchronization pattern detector 21c uses the third clock CLK2 among the multiphase clocks to detect the synchronization pattern data. That is, the synchronization pattern detector 21c performs sampling of the synchronization pattern included in the received transmission signal in response to the timing of a clock edge of CLK2. The synchronization pattern detector 21d uses the fourth clock CLK3 among the multiphase clocks to detect the synchronization pattern data. That is, the synchronization pattern detector 21d performs sampling of the synchronization pattern included in the received transmission signal in response to the timing of a clock edge of CLK3. Each of the synchronization pattern detectors 21a to 21d has a synchronization pattern storage section for storing a synchronization pattern set by the system in advance. Each of the synchronization pattern detectors 21a to 21d takes in the synchronization pattern data sampled with an inputted clock, and compares the synchronization pattern stored in the synchronization pattern storage section and the synchronization pattern data taken in. Then, if the synchronization pattern sampled with the inputted clock and the predetermined synchronization pattern correspond to each other, each of the synchronization pattern detectors 21a to 21d outputs a synchronization pattern detection result signal SP indicating that the synchronization pattern data included in the transmission signal has been correctly sampled. On the other hand, if the synchronization pattern stored in the synchronization pattern storage section and the synchronization pattern data taken in do not correspond to each other, the synchronization pattern detection result signal SP is not outputted (for example, the synchronization pattern detection signal shows a value indicating that the synchronization pattern data has not been detected). The synchronization pattern detection result signals SP0 to SP3 in FIG. 2 correspond to outputs of the synchronization pattern detectors 21a to 21d, respectively.

The phase comparison unit 22 in the synchronization detection section 20 has four phase comparators (22a to 22d in the figure) according to the number of the multiphase clocks. Receiving the multiphase clocks and the transmission signal, the phase comparators 22a to 22d compare the phase of a first clock included in the multiphase clocks, the phase of a second clock having a phase adjoining to that of the first clock, with the time point at which the data of the synchronization pattern data changes (the phase at the point at which the data of the synchronization pattern data changes), and output phase comparison result signals PC0 to PC3 indicating the position of the time point at which the data of the synchronization pattern changes. That is, the phase comparison unit 22 performs the operation shown below. The phase comparison unit 22 identifies whether change in the data of the synchronization pattern has occurred between clock edges where sampling of the synchronization pattern included in the transmission signal is performed, among clock edges that multiple clocks outputted by the second PLL circuit have. For example, each of the clock CLK0 and the clock CLK1 the phase of which is later than the phase of the clock CLK0 by 90 degrees has a clock edge (for example, a rising edge) where sampling of the synchronization pattern is performed. The phase comparison unit 22 identifies, for example, whether change in the data of the synchronization pattern exists between the clock edges of the clock CLK0 and the clock CLK1. Similarly, the phase comparison unit 22 identifies whether change in the data of the synchronization pattern exists between the clock edges of the clock CLK1 and the clock CLK2 the phase of which is later than the phase of the clock CLK1 by 90 degrees, the clock edges being those where sampling of the synchronization pattern is performed. Furthermore, the phase comparison unit 22 identifies whether change in the data of the synchronization pattern exists between the clock edges of the clock CLK2 and the clock CLK3 the phase of which is later than the phase of the clock CLK2 by 90 degrees, the clock edges being those where sampling of the synchronization pattern is performed.

The phase comparators 22a to 22d are the same, and they are different in the phase of a clock used for performing comparison with the synchronization pattern data. For example, the phase comparator 22a compares the phase of the clock CLK0 (the first input clock) and the phase of the clock CLK1 (the second input clock) among the multiphase clocks with the phase of the synchronization pattern. The phase comparator 22b compares the phase of the clock CLK1 (the first input clock) and the phase of the clock CLK2 (the second input clock) among the multiphase clocks with the phase of the synchronization pattern data. The phase comparator 22c compares the phase of the clock CLK2 (the first input clock) and the phase of the clock CLK3 (the second input clock) among the multiphase clocks with the phase of the synchronization pattern data. The phase comparator 22d compares the phases of the clock CLK3 (the first input clock) and the phase of the clock CLK0 (the second input clock) among the multiphase clocks with the phase of the synchronization pattern data. If there is a data change point of the synchronization pattern data between the phases of two inputted clocks (for example, between the rising edges of the two clocks), the phase comparators 22a to 22d output the phase comparison result signals PC0 to PC3 indicating that the data change point has been detected. If the data change point has not been detected, the phase comparison result signals PC0 to PC3 are not outputted (for example, the phase comparison result signals show a value indicating that the data change point has not been detected).

Figure 3:
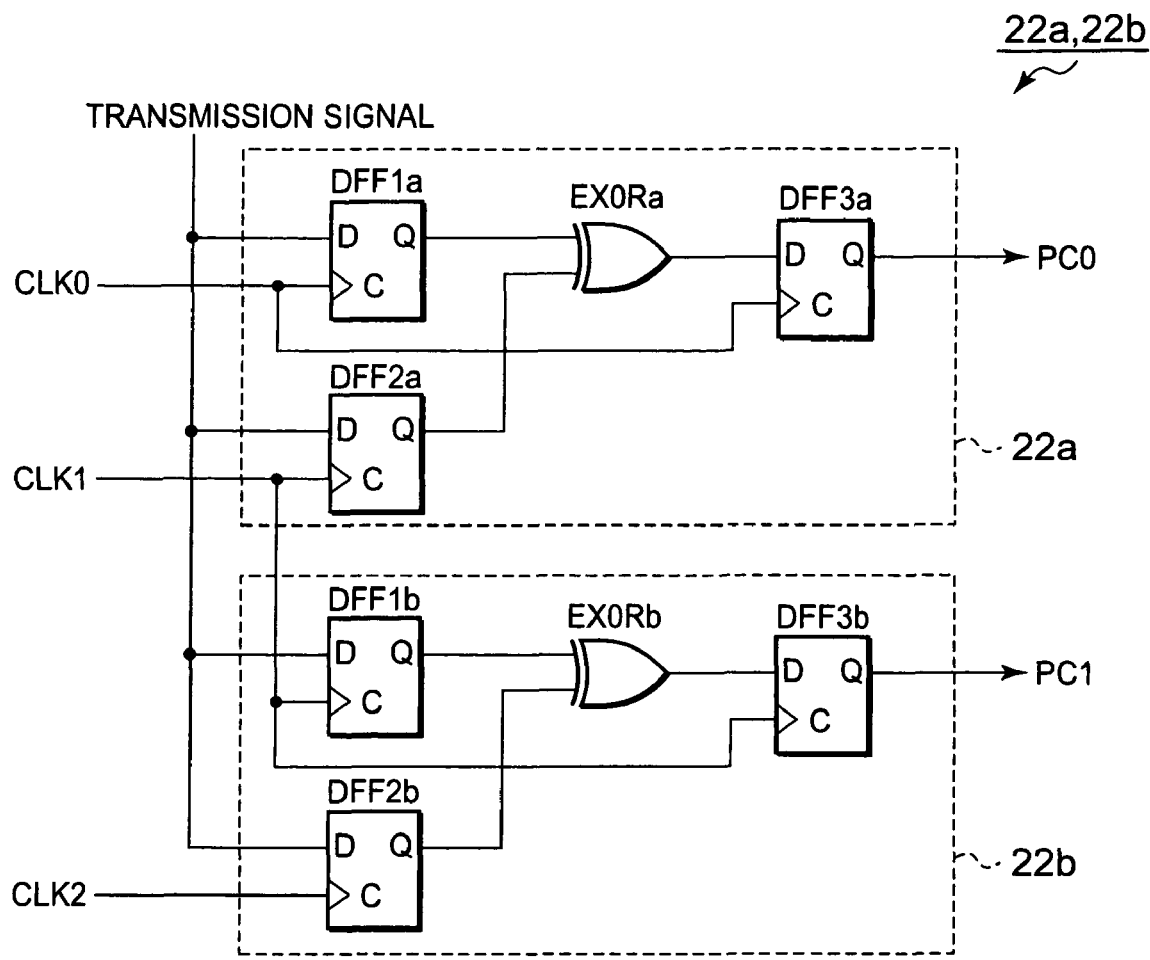
FIG. 3 is a block diagram of a phase comparator according to the first embodiment.

Here, an example of the circuit diagram of the phase comparators 22a to 22d is shown in FIG. 3. In the example shown in FIG. 3, only the phase comparators 22a and 22b are shown. The phase comparator 22a has D flip flops DFF1a to DFF3a and an exclusive OR circuit EXORa. In the D flip flop DFF1a, a transmission signal is inputted to a data terminal D, and the clock CLK0 is inputted to a clock input terminal C. The D flip flop DFF1a takes in the value of the data included in thee transmission signal according to the rising edge of the clock CLK0 and outputs the value from an output terminal Q. In the D flip flop DFF2a, the transmission signal is inputted to a data terminal D, and the clock CLK1 is inputted to a clock input terminal C. The D flip flop DFF2a takes in the value of the data included in the transmission signal according to the rising edge of the clock CLK1 and outputs the value from an output terminal Q. In the exclusive OR circuit EXORa, the output terminal Q of the D flip flop DFF1a is connected to one input terminal, and the output terminal Q of the D flip flop DFF2a is connected to the other input terminal. The exclusive OR circuit EXORa outputs the result of the exclusive OR operation of two inputs. In the D flip flop DFF3a, the output terminal of the exclusive OR circuit EXORa is connected to a data terminal D, and the clock CLK0 is inputted to a clock input terminal C. The D flip flop DFF3a takes in the output value of the exclusive OR circuit EXORa according to the rising edge of the clock CLK0, and outputs the output value from an output terminal Q as a phase comparison result signal PC0.

The phase comparator 22b has D flip flops DFF1b to DFF3b and an exclusive OR circuit EXORb. In the D flip flop DFF1b, a transmission signal is inputted to a data terminal D, and the clock CLK1 is inputted to a clock input terminal C. The D flip flop DFF1b takes in the value of the data included in the transmission signal according to the rising edge of the clock CLK1 and outputs the value from an output terminal Q.

In the D flip flop DFF2b, the transmission signal is inputted to a data terminal D, and the clock CLK2 is inputted to a clock input terminal C. The D flip flop DFF2b takes in the value of the data included in the transmission signal according to the rising edge of the clock CLK2 and outputs the value from an output terminal Q. In the exclusive OR circuit EXORb, the output terminal Q of the D flip flop DFF1b is connected to one input terminal, and the output terminal Q of the D flip flop DFF2b is connected to the other input terminal. The exclusive OR circuit EXORb outputs the result of the exclusive OR operation of two inputs. In the D flip flop DFF3b, the output terminal of the exclusive OR circuit EXORb is connected to a data terminal D, and the clock CLK1 is inputted to a clock input terminal C. The D flip flop DFF3b takes in the output value of the exclusive OR circuit EXORb according to the rising edge of the clock CLK1, and outputs the output value from an output terminal Q as a phase comparison result signal PC1.

Figure 4:
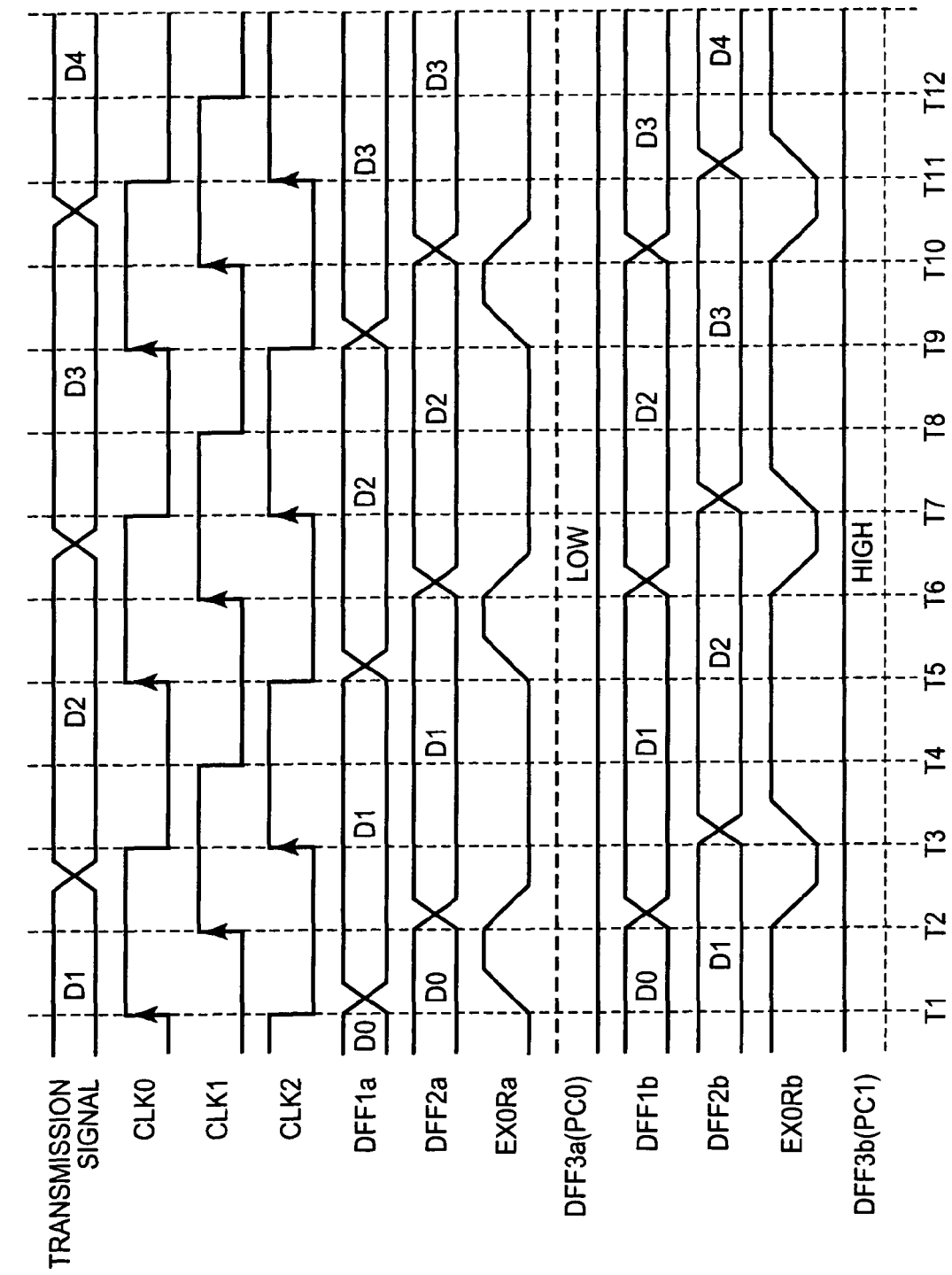
FIG. 4 is a timing chart showing the operation of the phase comparator according to the first embodiment.

Here, a timing chart showing the operation of the phase comparators 22a and 22b is shown in FIG. 4. As shown in FIG. 4, data D1 to D4 (data after D4 are not shown in the figure) are sequentially inputted as a transmission signal. When the clock CLK0 is assumed to be a reference clock (phase difference: 0), each of the phases of the clocks CLK0 to CLK2 are delayed by 90 degrees.

In such a case, in the phase comparator 22a, the D flip flop DFF1a takes in the data D1 according to the clock CLK0 at a timing T1. The D flip flop DFF2a takes in the data D1 according to the clock CLK1 at a timing T2. In this case, since the output from the D flip flop DFF1a and the output from the D flip flop DFF2a do not correspond to each other in the section from the timing T1 to the timing T2, the output from the exclusive OR circuit EXORa is at a high level in the section from the timing T1 to the timing T2. On the other hand, the D flip flop DFF3a takes in the output from the exclusive OR circuit EXORa according to the clock CLK0 at the timing T1. Since the exclusive OR circuit EXORa outputs at a low level at the timing T1, the D flip flop DFF3a outputs a low-level phase comparison result signal PC0.

On the other hand, in the phase comparator 22b, the D flip flop DFF1b takes in the data D1 according to the clock CLK1 at the timing T2. The D flip flop DFF2b takes in the data D2 according to the clock CLK2 at a timing T3. In this case, since the output from the D flip flop DFF1b and the output from the D flip flop DFF2b correspond to each other in the section from the timing T2 to the timing T3, the output from the exclusive OR circuit EXORb is at a low level in the section from the timing T2 to the timing T3. The exclusive OR circuit EXORa is at a high level before the timing T2 and after the timing T3. The D flip flop DFF3b takes in the output from the exclusive OR circuit EXORb according to the clock CLK1 at the timing T2. Since the exclusive OR circuit EXORb outputs at a high level at the timing T2, the D flip flop DFF3b outputs a high-level phase comparison result signal PC1.

Thus, when there is a data change point of targeted synchronization pattern data after the rising edge of the first clock, the phase comparators 22a to 22d output low-level phase comparison result signals PC0 to PC3. On the other hand, when there is a data change point of targeted synchronization pattern data before the rising edge of the first clock, the phase comparators 22a to 22d output high-level phase comparison result signals PC0 to PC3. After a timing T4 shown in FIG. 4, the operation of the timings T1 to T3 is also continuously performed.

The phase judgment section 30 has a synchronization pattern judgment section 31, a phase comparison result judgment section 32 and a judgment result holding section 33. The synchronization pattern judgment section 31 judges the number of the phase of a clock with which the synchronization pattern data has been detected, on the basis of the synchronization pattern detection result signals SP0 to SP3, and outputs it to the judgment result holding section 33. The phase comparison result judgment section 32 judges between which phases of the multiphase clocks the data change point of the synchronization pattern data exists on the basis of the phase comparison result signals PC0 to PC3, and outputs the judgment result to the judgment result holding section 33. The judgment result holding section 33 judges a synchronization clock having a phase different from the data change point of the synchronization pattern data, on the basis of the judgment result outputted by the phase comparison result judgment section 32 and the judgment result of the synchronization pattern judgment section 31, and outputs a phase judgment signal DR which specifies the selected clock. That is, the phase comparison unit 22 has already identified between which clock edges of which clocks the change in the data of the synchronization pattern occurs. Therefore, the phase judgment section 30 judges one of clocks other than two clocks, that is, a clock having a clock edge which is the nearest to the time point at which change in the data occurs and at which sampling of the synchronization pattern is performed and a clock having a clock edge (an edge where sampling of the synchronization pattern is performed) which is the second nearest to the time point next to that clock edge, among clocks with which the synchronization pattern has been correctly sampled, to be a synchronization clock to be used for sampling of the transmission signal. Specifically, the phase judgment signal DR specifies a clock corresponding to the number of a phase which is farthest away from the phase of the data change point indicated by the judgment result of the synchronization pattern judgment section 31 and the judgment result of the phase comparison result judgment section 32, among the numbers of phases which can be synchronized, which are shown by the judgment result of the synchronization pattern judgment section 31, as a synchronization clock. The phase of the selected clock is specified on the basis of the number of the phase of the synchronization clock.

The judgment result update timing control section 40 outputs a refresh signal RFSH in response to any one of the synchronization pattern detection result signals SP0 to SP3 having detected a synchronization pattern. The refresh signal RFSH is inputted to the synchronization pattern judgment section 31, the phase comparison result judgment section 32 and the judgment result holding section 33. Receiving the input of the refresh signal RFSH, the synchronization pattern judgment section 31, the phase comparison result judgment section 32 and the judgment result holding section 33 initialize a previous judgment result.

The clock selection circuit 50 selects any one clock from among multiphase clocks on the basis of a phase judgment signal DR. For example, when the phase judgment signal DR shows the clock CLK0 of the first phase, the clock CLK0 is selected and outputted as a selected clock.

Figure 5:
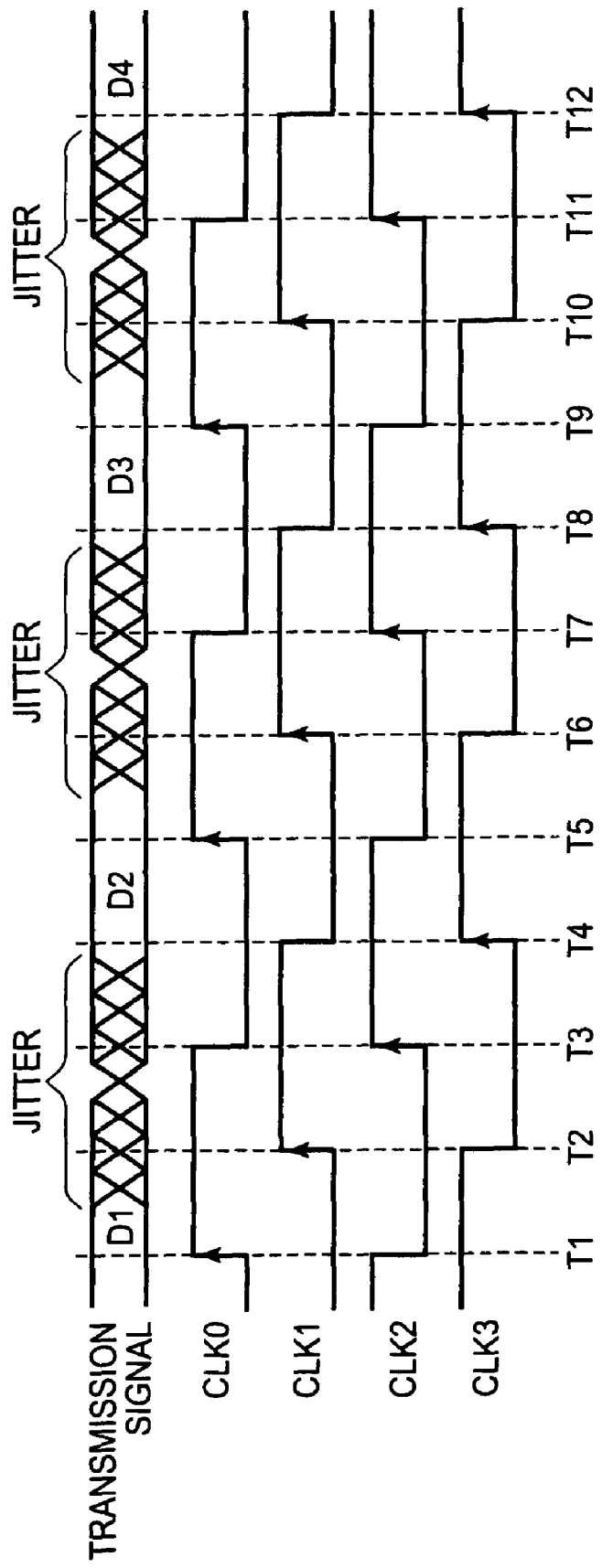
FIG. 5 is a timing chart showing the relationship between a transmission signal and multiphase clocks according to the first embodiment.
Figure 6:
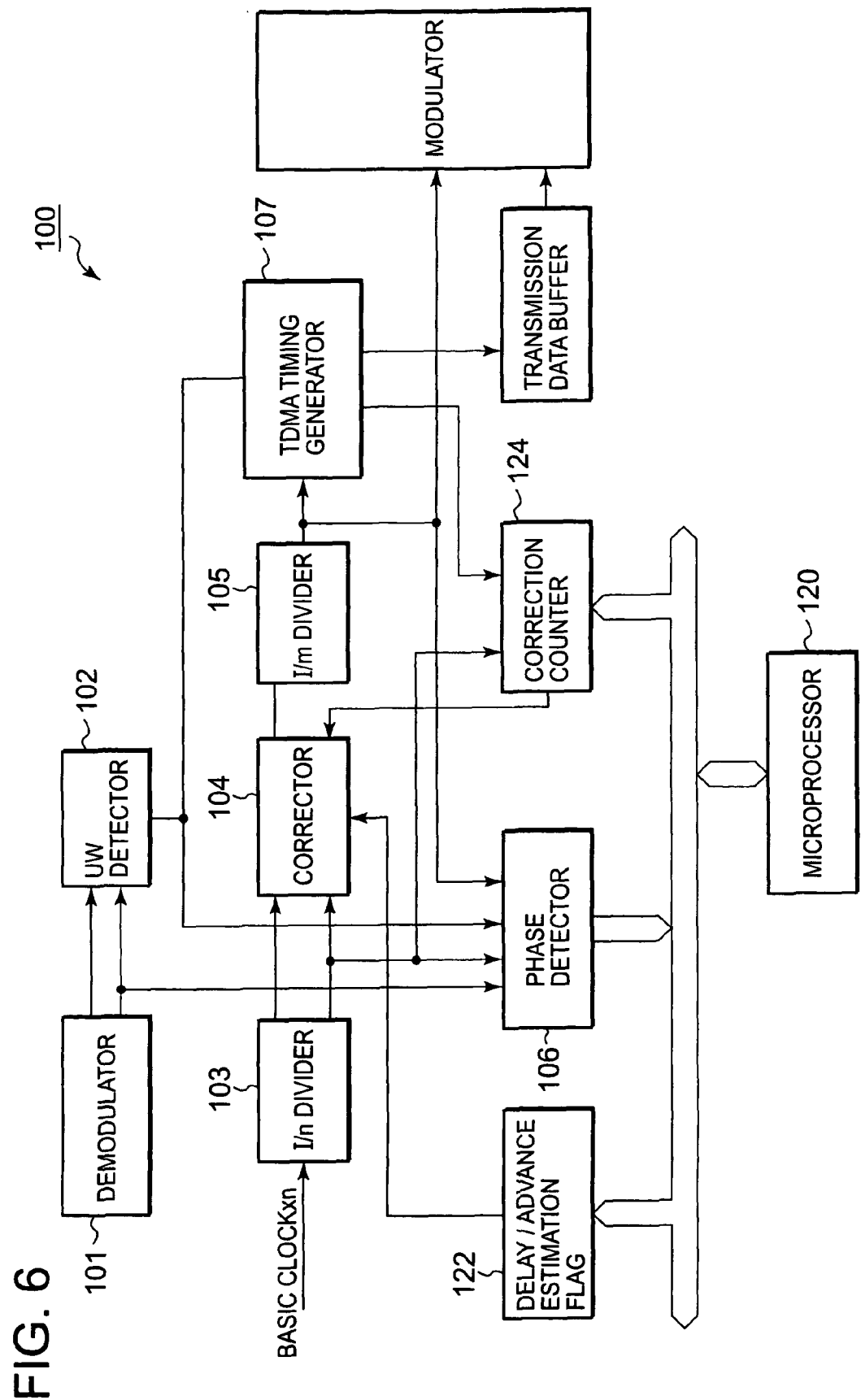
FIG. 6 is a block diagram of the synchronization pull-in apparatus described in Japanese Patent Laid-Open No. 8-8811.

Here, an example of a timing chart showing the relationship between a transmission signal and multiphase clocks is shown in FIG. 5 in order to describe the operation of the clock phase selection circuit 14. In the example shown in FIG. 5, clocks CLK0 to CLK3 are in a relationship that they are sequentially delayed by 90 degrees. The transmission signal has a data change point between the rising edge of the clock CLK1 and the rising edge of the clock CLK2. Furthermore, it is assumed that the transmission signal and clocks have jitter and the position of the data change point or phase of clocks fluctuates. However, in general, jitters occur in a same direction.

In such a case, the synchronization pattern detectors 21a and 21d output synchronization pattern detection result signals SP0 and SP3 indicating that the synchronization pattern data has been correctly detected, that is, the synchronization pattern has been correctly sampled. On the other hand, in the synchronization pattern detectors 21b and 21c, there may be a case that any bit included in the synchronization pattern data is an error due to the fluctuation of the data change point caused by jitter. Therefore, in the case where the synchronization pattern data becomes incorrect due to jitter, the synchronization pattern detectors 21b and 21c output synchronization pattern detection result signals SP1 and SP2 indicating that the synchronization pattern data has not been correctly sampled.

On the basis of such synchronization pattern detection result signals SP0 to SP3, the synchronization pattern judgment section 31 outputs a judgment result showing the fourth clock (the clock CLK0 in the example shown in FIG. 5) and the third clock (the clock CLK3 in the example shown in FIG. 5) with which the synchronization pattern data has been correctly detected, to the judgment result holding section 33.

Since the data change point of the synchronization pattern data exits after the rising edge of the clock CLK0, the phase comparator 22a causes the phase comparison result signal PC0 to indicate a low level. Since the data change point of the synchronization pattern data exits before the rising edge of the clock CLK3, the phase comparator 22d causes the phase comparison result signal PC3 to indicate a high level. As for the phase comparators 22b and 22c, the logical level of the phase comparison result signals PC1 and PC2 changes due to the fluctuation of the data change point caused by jitter.

On the basis of such phase comparison result signals PC0 to PC3, the phase comparison result judgment section 32 outputs a judgment result indicating that there is a data change point of the synchronization pattern data between the rising edge of the first clock (the clock CLK1 in the example in FIG. 5) and the rising edge of the second clock (the clock CLK2 in the example in FIG. 5), to the judgment result holding section 33.

On the basis of the judgment result outputted by the phase comparison result judgment section 32 and the judgment result of the synchronization pattern judgment section 31, the judgment result holding section 33 outputs a phase judgment signal DR showing the clock CLK0 the phase of which is farthest away from the clock CLK1 and the clock CLK2 having a data change point (for example, which has the rising edge at the farthest position). On the basis of this phase judgment signal DR, the clock selection circuit 50 selects the clock CLK0 from among the multiphase clocks, and outputs it as a selected clock. Then, when data to be transmitted as a transmission signal becomes synchronization pattern data for the next cycle, any of the synchronization pattern detectors 21a to 21d detects the synchronization pattern data and outputs a synchronization pattern detection result signal. On the basis of this synchronization pattern detection result signal, the judgment result update timing control section 40 outputs a refresh signal RFSH, and the synchronization pattern judgment section 31, the phase comparison result judgment section 32 and the judgment result holding section 33 are initialized. Then, after the initialization, the synchronization pattern judgment section 31, the phase comparison result judgment section 32 and the judgment result holding section 33 output a phase judgment signal DR for the new synchronization pattern data.

As shown in the above description, according to the clock phase selection circuit 14 according to this embodiment, detection of synchronization pattern data and detection of the phase of a data change point of the synchronization pattern data are performed, and a selected clock to be a synchronization clock for the synchronization pattern data is selected on the basis of the detection results. Specifically, the clock phase selection circuit 14 judges the phases of multiphase clocks to output a selected clock from the logical levels of a synchronization pattern detection result signal SP and a phase comparison result signal PC, without performing complicated operation. In the clock phase selection circuit 14 according to this embodiment, since selection of a phase is performed on the basis of synchronization pattern data added before processing data, the timing for determining the selected clock is not delayed relative to the timing of sampling of the processing data by the sampling circuit. That is, by using the clock phase selection circuit 14 according to this embodiment, it is possible to select the phase of an optimum selected clock for a transmission signal without delay. Accordingly, it is possible to perform reliable transmission/receiving of data even between apparatuses which perform transmission/receiving of the data in synchronization with clocks which are not synchronized with each other.

Furthermore, in the receiving apparatus according to this embodiment, a transmission signal is handled as 1-bit serial data. Thereby, it is possible to reduce the number of wires for connecting apparatuses and the number of terminals of the transmission-side apparatus and the receiving-side apparatus. In a system such as a cellular phone, since the implementation area of the apparatus and wires is limited, it is very advantageous that the number of terminals and the number of wires can be reduced.

The present invention is not limited to the above embodiment, and it is possible to make change appropriately within the range not departing from the spirit thereof. For example, the configuration of the phase comparator is not limited to the above embodiment, and it is possible to make change appropriately according to an input signal.

It is apparent that the present invention is not limited to the above embodiments, but may be modified and changed without departing from the scope and spirit of the invention.

What is claimed is:

1. A communication apparatus comprising:
    a storage section storing a first synchronization pattern;
    a synchronization pattern detection unit receiving a signal including a second synchronization pattern to sample said second synchronization pattern with a plurality of clocks, phases of said plurality of clocks being different from each other, and comparing said first synchronization pattern with results of sampling said second synchronization pattern to identify a clock or clocks among said plurality of clocks, said first synchronization pattern being sampled correctly with said identified clock or clocks;
    a phase comparison unit identifying a first clock and a second clock among said plurality of clocks, a data of said second synchronization pattern changing between an edge of said first clock and an edge of said second clock; and
    a phase judgment section coupled to said synchronization pattern detection unit and said phase comparison unit to identify a third clock to be used for sampling said signal among said identified clock or clocks,
    wherein said third clock has a different phase from said first and second clocks, and wherein a phase difference between said third clock and a time point at which said data of said second synchronization pattern changes is larger than a phase difference between another clock included in said plurality of clocks and said time point.

2. The communication apparatus according to claim 1, further comprising:
   a Phase-Locked Loop (PLL) circuit outputting said plurality of clocks; and
   a clock selection circuit coupled to said phase judgment section and said PLL circuit to receive said plurality of clocks, to select said third clock among said plurality of clocks, and to output selected third clock.

3. The communication apparatus according to claim 2, further comprising:
   a sampling circuit coupled to said clock selection circuit to receive said third clock and to sample said signal with said third clock.

4. A communication apparatus, comprising:
   a Phase-Locked Loop (PLL) circuit configured to generate a plurality of multiphase clock signals each having a different phase timing;
   a phase comparison unit configured to receive a data signal, and detect a data changing timing of the data signal based on the plurality of multiphase clock signals;
   a phase judgment unit configured to select a sampling clock signal from the plurality of multiphase clock signals based on a detection result of the phase comparison unit;
   a synchronization pattern detection unit configured to receive the data signal, and to determine which muitiphase clock signals of the plurality of multiphase clock signals detect a synchronization pattern of the data signal correctly;
   wherein a phase difference between the sampling clock signal and the data changing timing is greater than a phase difference between the data changing timing and another clock signal of the plurality of multiphase clock signals, and
   wherein the phase judgment unit selects the sampling clock signal from the multiphase clock signals of the plurality of multiphase clock signals that were determined to have detected the synchronization pattern of the data signal correctly.

5. The communication apparatus according to claim 4, further comprising a sampling circuit configured to sample the data signal with the sampling clock signal.

* * * * *